(12) United States Patent
Im et al.

(10) Patent No.: US 10,690,979 B2
(45) Date of Patent: Jun. 23, 2020

(54) DISPLAY PANEL AND METHOD OF MANUFACTURING THE SAME

(71) Applicant: Samsung Display Co., Ltd, Yongin-si, Gyeonggi-do (KR)

(72) Inventors: Wan-Soon Im, Cheonan-si (KR); Young Goo Song, Asan-si (KR); Yeo Geon Yoon, Suwon-si (KR); Jang-Bog Ju, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 318 days.

(21) Appl. No.: 15/278,915

(22) Filed: Sep. 28, 2016

(65) Prior Publication Data

US 2017/0199440 A1    Jul. 13, 2017

(30) Foreign Application Priority Data

Jan. 11, 2016    (KR) ........................ 10-2016-0003346

(51) Int. Cl.
| | |
|---|---|
| *G02F 1/1362* | (2006.01) |
| *G02F 1/1335* | (2006.01) |
| *G02F 1/1343* | (2006.01) |
| *G02F 1/1368* | (2006.01) |
| *G02F 1/137* | (2006.01) |

(52) U.S. Cl.
CPC ........ *G02F 1/136286* (2013.01); *G02F 1/137* (2013.01); *G02F 1/1368* (2013.01); *G02F 1/133514* (2013.01); *G02F 1/134309* (2013.01); *G02F 1/136209* (2013.01); *G02F 2001/13756* (2013.01)

(58) Field of Classification Search
CPC ..................... G02F 1/133514; G02F 1/136286
See application file for complete search history.

(56) References Cited

FOREIGN PATENT DOCUMENTS

JP    2010-096974 A    4/2010

*Primary Examiner* — Joseph L Williams
*Assistant Examiner* — Jacob R Stern
(74) *Attorney, Agent, or Firm* — Innovation Counsel LLP

(57) ABSTRACT

A display panel includes a first base substrate, a gate line and a data line, a thin film transistor disposed on the first base substrate, and electrically connected to the gate line and the data line, a first electrode electrically connected to the thin film transistor, a third electrode spaced apart from the first electrode in a plan view, a second electrode facing the first electrode and the third electrode, and entirely overlapping the data line in a first direction, and a liquid crystal layer disposed between the first and third electrodes and the second electrode.

19 Claims, 19 Drawing Sheets

DISPLAY PANEL AND METHOD OF MANUFACTURING THE SAME

This application claims priority to and the benefit of Korean Patent Application No. 10-2016-0003346, filed on Jan. 11, 2016, the disclosure of which is incorporated by reference herein in its entirety.

BACKGROUND

1. Field

Exemplary embodiments of the inventive concept relate to a display panel and a method of manufacturing the display panel. More particularly, exemplary embodiments of the inventive concept relate to a transparent display panel and a method of manufacturing the transparent display panel.

2. Description of the Related Art

Recently, a display apparatus having light weight and small size has been manufactured. A cathode ray tube (CRT) display apparatus has been used due to a performance and a competitive price. However, the CRT display apparatus has a weakness with a size or portability. Therefore, a display apparatus such as a plasma display apparatus, a liquid crystal display apparatus and an organic light emitting display apparatus has been highly regarded due to small size, light weight and low-power-consumption.

The liquid crystal display may have various pixel structures according to driving method. Various efforts have been made to improve aperture ratio and transmittance.

SUMMARY

One or more exemplary embodiment of the inventive concept provides a display panel capable of improving transmittance and control the transmittance.

One or more exemplary embodiments of the inventive concept also provide a method of manufacturing the display panel.

According to an exemplary embodiment of the inventive concept, a display panel includes a first base substrate, a gate line and a data line, a thin film transistor disposed on the first base substrate, and electrically connected to the gate line and the data line, a first electrode electrically connected to the thin film transistor, a third electrode spaced apart from the first electrode in a plan view, a second electrode facing the first electrode and the third electrode, and entirely overlapping the data line in a first direction, and a liquid crystal layer disposed between the first and third electrodes and the second electrode.

In an exemplary embodiment, when on voltage is configured to be applied to the third electrode, a portion of the liquid crystal layer between the third electrode and the second electrode may be configured to pass light. When off voltage is configured to be applied to the third electrode, the portion of the liquid crystal layer between the third electrode and the second electrode may be configured to block light.

In an exemplary embodiment, a common voltage may be configured to be applied to the second electrode, and a difference between the off voltage and the common voltage may be less than 1.5V (voltage).

In an exemplary embodiment, a voltage having a value between the on voltage and the off voltage may be configured to be applied to the third electrode.

In an exemplary embodiment, a portion of the third electrode may overlap the data line.

In an exemplary embodiment, the third electrode may be configured not to be electrically connected to the thin film transistor in a pixel.

In an exemplary embodiment, the display panel may further include a color filter which is disposed to overlap the first electrode, and not to overlap the third electrode.

In an exemplary embodiment, the first electrode and the third electrode may include a same material.

In an exemplary embodiment, the first electrode and the third electrode may be disposed in a same plane.

In an exemplary embodiment, the display panel may further include a light blocking pattern overlapping the thin film transistor.

In an exemplary embodiment, the light blocking pattern may be not connected to and spaced apart from a light blocking pattern of an adjacent pixel.

In an exemplary embodiment, the first electrode may include a first high electrode and a first low electrode. The thin film transistor may include a first thin film transistor and a second thin film transistor. The first high electrode may be electrically connected to the first thin film transistor. The first low electrode may be electrically connected to the second thin film transistor.

In an exemplary embodiment, the display panel may further include a third thin film transistor and a dividing reference voltage line extending in parallel with the data line. The third thin film transistor may be electrically connected to the dividing reference voltage line and the second thin film transistor. A dividing reference voltage may be configured to be applied to the dividing reference voltage line.

In an exemplary embodiment, the dividing reference voltage line may not overlap the first high electrode and the first low electrode.

In an exemplary embodiment, the third electrode may include a first stem extending in a first direction, a second stem extending in a second direction which crosses the first direction, and a plurality of slit portions extending in a direction which is inclined with respect to the first and second directions. The slit portions may form a plurality of slits.

In an exemplary embodiment, the third electrode may include a connecting electrode extending in parallel with the gate line. The connecting electrode may be electrically connected to a third electrode of an adjacent pixel.

In an exemplary embodiment, the third electrode may overlap the thin film transistor.

According to an exemplary embodiment of the inventive concept, a method of manufacturing a display panel includes forming a thin film transistor on a first base substrate, forming a first electrode and a third electrode by patterning a pixel electrode layer after forming the pixel electrode layer on the thin film transistor, forming a second electrode which faces the first and third electrodes on a second base substrate, forming a color filter which overlaps the first electrode on the second base substrate, and forming a liquid crystal layer between the first substrate and the second substrate. The pixel electrode layer includes transparent conductive material. The third electrode is electrically connected to the thin film transistor. The third electrode is spaced apart from the first electrode.

In an exemplary embodiment, the color filter does not overlap the third electrode.

According to an exemplary embodiment of the inventive concept, a display panel includes a first electrode electrically connected to a data line and a gate line, a third electrode, wherein voltages different from each other are configured to be applied thereto according to a transparent mode or a normal mode, a second electrode facing the first and third electrodes, wherein a common voltage is configured to be applied thereto, and a liquid crystal layer disposed between the first and third electrodes and the second electrode. The display panel is configured to work as a transparent display device which is transparent to display an image in the transparent mode. The display panel is configured to work as a normal display device which is not transparent to display an image in the normal mode.

According to the present inventive concept, a display panel includes a first electrode, a second electrode, a third electrode and a liquid crystal layer to embody a transparent mode and a normal mode. In the transparent mode, an on voltage is applied to the third electrode, and a common voltage is applied to the second electrode. Accordingly, the liquid crystal layer passes light, so that the display panel can work as a transparent display. In the normal mode, an off voltage is applied to the third electrode, and the common voltage is applied to the second electrode. Accordingly, the liquid crystal layer blocks light, so that the display panel can work as a traditional display.

In addition, the display panel may minimize size of a light blocking pattern, and may improve transparency of the display panel by designing a shape of the third electrode. In addition, the transparency may be controlled by adjusting voltage level applied to the third electrode.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION

Hereinafter, the inventive concept will be explained in detail with reference to the accompanying drawings.

Figure 1:
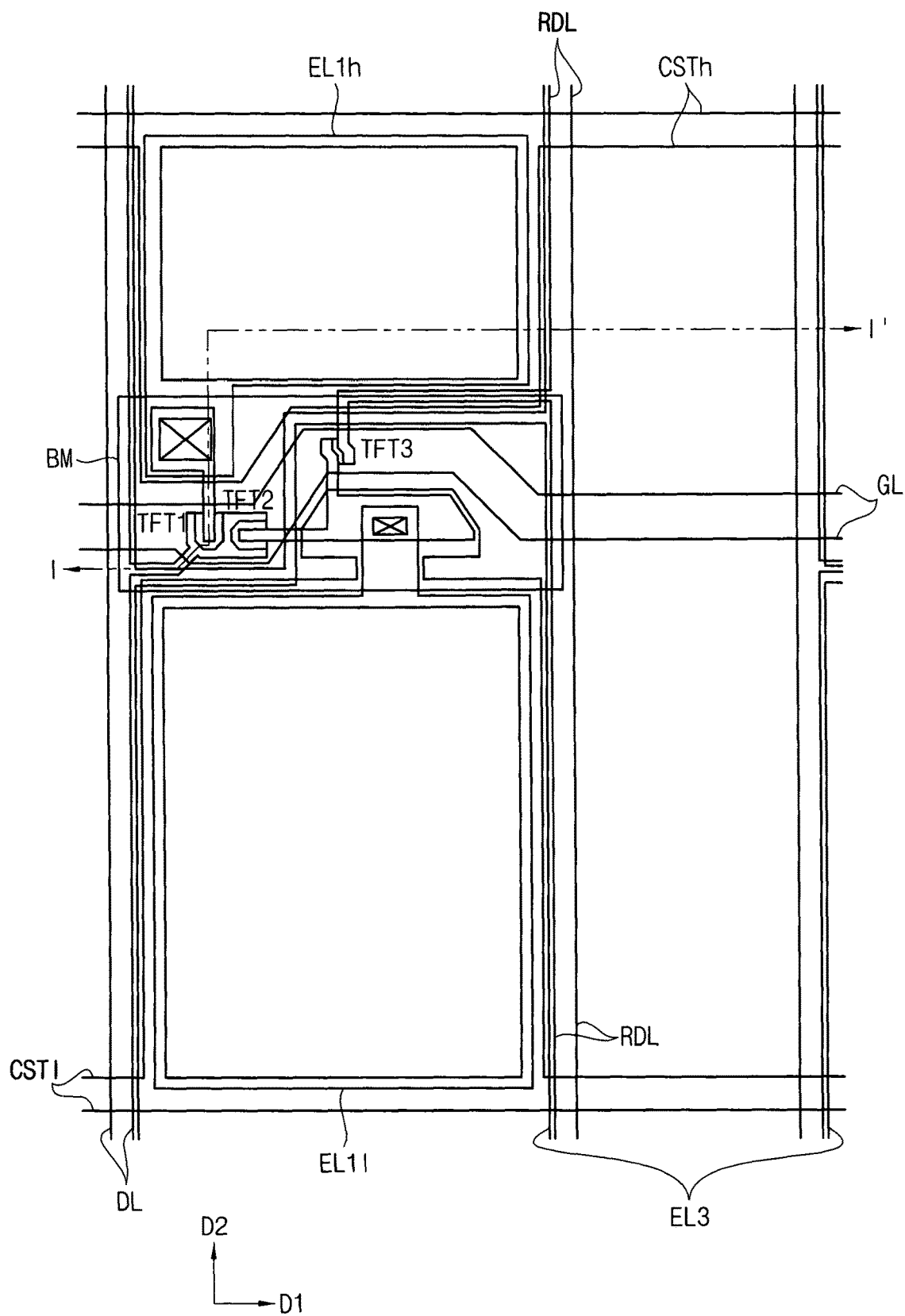
FIG. 1 is a plan view illustrating one pixel of a display panel according to an exemplary embodiment of the inventive concept.
Figure 2:
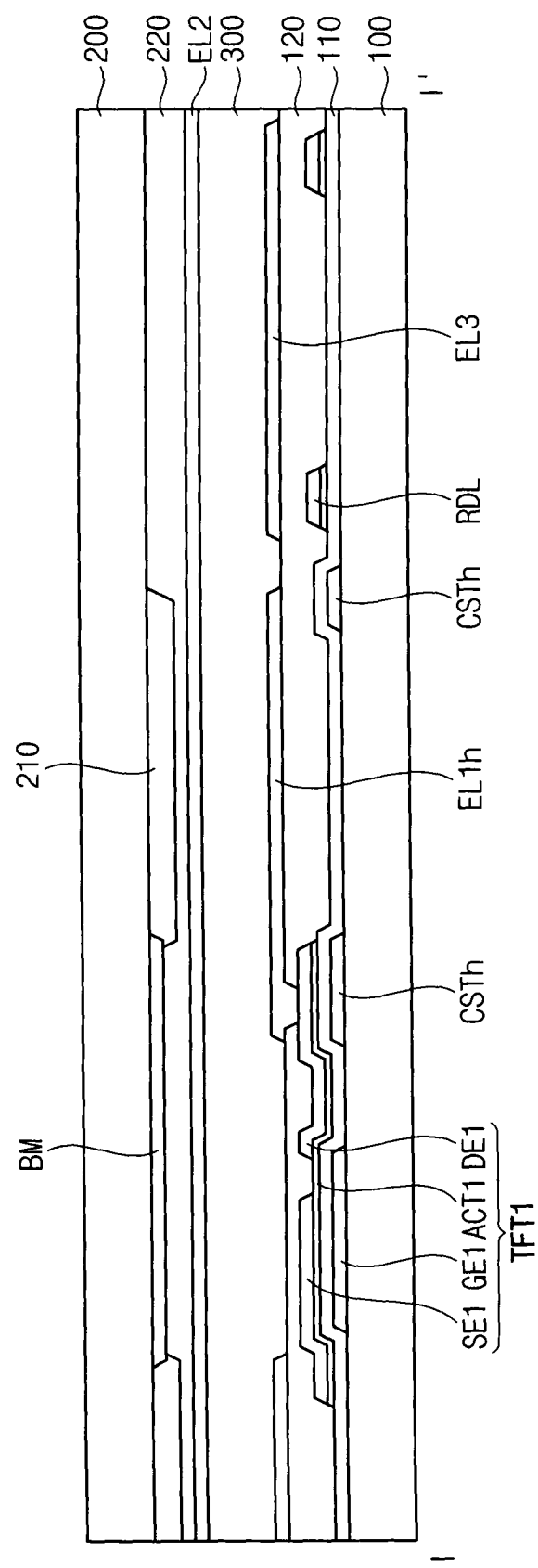
FIG. 2 is a cross-sectional view taken along a line I-I' of FIG. 1.

FIG. 1 is a plan view illustrating one pixel of a display panel according to an exemplary embodiment of the inventive concept. FIG. 2 is a cross-sectional view taken along a line I-I' of FIG. 1.

Referring to FIGS. 1 and 2, the display panel may include a first base substrate 100, a gate line GL, a high storage pattern CSTh, a low storage pattern CSTl, a first insulation layer 110, a data line DL, a voltage dividing reference voltage line RDL, a second insulation layer 120, a first high electrode EL1$h$, a first low electrode EL1$l$, a third electrode EL3, a second base substrate 200, a light blocking pattern BM, a color filter 210, an over-coating layer 220, a second electrode EL2 and a liquid crystal layer 300.

The first base substrate 100 may include a transparent insulation substrate. For example, the first base substrate 100 may include a glass substrate, a quartz substrate, a transparent resin substrate, etc. Examples of the transparent resin substrate for the first base substrate 100 may include polyimide-based resin, acryl-based resin, polyacrylate-based resin, polycarbonate-based resin, polyether-based resin, sulfonic acid containing resin, polyethyleneterephthalate-based resin, etc.

The gate line GL may be disposed on the first base substrate 100. The gate line GL may be extended in a first direction D1. The gate line GL may be electrically connected to a first gate electrode GE1. For example, the first gate electrode GE1 may be a portion of the gate line GL. In addition, the gate line GL may be electrically connected to a second gate electrode and a third gate electrode. For example, the second gate electrode and the third gate electrode may be a portion of the gate line GL.

The gate line GL may include metal, alloy, conductive metal oxide, a transparent conductive material, etc.

Although not shown in figures, a buffer layer may be disposed between the first base substrate 100 and the gate line GL. The buffer layer may prevent diffusion of metal atoms and/or impurities from the first base substrate 100. Additionally, in case that the first base substrate 100 may have a relatively irregular surface, the buffer layer may improve flatness of the surface of the first base substrate 100. The buffer layer may be formed using a silicon compound. For example, the buffer layer may include silicon oxide (SiOx), silicon nitride (SiNx), silicon oxynitride (SiOxNy), silicon oxycarbide (SiOxCy), silicon carbon nitride (SiCxNy), etc. These may be used alone or in a mixture thereof. The buffer layer may have a single layer structure or a multi layer structure. For example, the buffer layer may have a single-layered structure including a silicon oxide film, a silicon nitride film, a silicon oxynitride film, a silicon oxycarbide film or a silicon carbon nitride film. Alternatively, the buffer layer may have a multilayered structure including at least two of a silicon oxide film, a silicon nitride film, a silicon oxynitride film, a silicon oxycarbide film, a silicon carbon nitride film, etc.

The high storage pattern CSTh may be disposed on the first base substrate 100. The high storage pattern CSTh may be electrically connected to a high storage pattern of an adjacent pixel in the first direction D1. The high storage pattern CSTh may be overlapped with a boundary of the first high electrode EL1$h$. A storage voltage may be applied to the high storage pattern CSTh.

The high storage pattern CSTh may include metal, alloy, conductive metal oxide, a transparent conductive material, etc.

The low storage pattern CSTl may be disposed on the first base substrate 100. The low storage pattern CSTl may be electrically connected to a low storage pattern of the adjacent pixel in the first direction D1. The low storage pattern CST1 may be overlapped with a boundary of the first low electrode EL1*l*. A storage voltage may be applied to the low storage pattern CST1.

The first insulation layer 110 may be disposed on the first base substrate 100 on which the gate line GL, the high storage pattern CSTh and the low storage pattern CST1 are disposed. The first insulation layer 110 may include a silicon compound, metal oxide, etc. For example, the first insulation layer 110 may be formed using silicon oxide (SiOx), silicon nitride (SiNx), silicon oxynitride (SiOxNy), aluminum oxide (AlOx), tantalum oxide (TaOx), hafnium oxide (HfOx), zirconium oxide (ZrOx), titanium oxide (TiOx), etc. These may be used alone or in a combination thereof. In addition, the first insulation layer 110 may have a single layer structure or a multi layer structure including the silicon oxide and/or the silicon nitride. In example embodiments, the first insulation layer 110 may be uniformly formed on the first base substrate 100 along a profile of the gate line GL, the high storage pattern CSTh and the low storage pattern CST1. Here, the first insulation layer 110 may have a substantially small thickness, such that a stepped portion may be formed at a portion of the gate line GL, the high storage pattern CSTh and the low storage pattern CST1. In some example embodiments, the first insulation layer 110 may have a relatively large thickness for sufficiently covering the gate line GL, the high storage pattern CSTh and the low storage pattern CST1.

An active pattern may be disposed on the first insulation layer 110. The active pattern may include a first active area ACT1, a second active area, and a third active area. The first active area ACT1 may be overlapped with the first gate electrode GE1. The second active area may be overlapped with the second gate electrode. The third active area may be overlapped with the third gate electrode. The active pattern may include a semiconductor layer consisting of amorphous silicon (a-Si:H) and an ohmic contact layer consisting of n+ amorphous silicon (n+ a-Si:H). In addition, the active pattern may include an oxide semiconductor. The oxide semiconductor may include an amorphous oxide including at least one selected from the group consisting of indium (In), zinc (Zn), gallium (Ga), tin (Sn) and hafnium (Hf).

The data line DL may be disposed on the first insulation layer 110. The data line DL may be extended in a second direction D2 which crosses the first direction D1. The second direction D2 may be substantially perpendicular to the first direction D1. The data line DL may be electrically connected to a first source electrode SE1 and a second source electrode. The data line DL may include metal, alloy, conductive metal oxide, a transparent conductive material, etc.

The first source electrode SE1 may be electrically connected to the first active area ACT1 of the active pattern. A first drain electrode DE1 may be spaced apart from the first source electrode SE1, and electrically connected to the first active area ACT1 of the active pattern.

The second source electrode may be electrically connected to the second active area of the active pattern. A second drain electrode may be spaced apart from the second source electrode, and electrically connected to the second active area of the active pattern.

The voltage dividing reference voltage line RDL may be disposed on the first insulation layer 110. The voltage dividing reference voltage line RDL may be spaced apart from the data line DL in the first direction D1, and extend in the second direction D2. The voltage dividing reference voltage line RDL may be electrically connected to a third drain electrode. The voltage dividing reference voltage line RDL may include metal, alloy, conductive metal oxide, a transparent conductive material, etc.

The third drain electrode may be electrically connected to the third active area of the active pattern. A third source electrode may be spaced apart from the third drain electrode, and electrically connected to the third active area of the active pattern. The third source electrode may be electrically connected to the second drain electrode.

The first gate electrode GE1, the first source electrode SE1, the first drain electrode DE1, the first active area ACT1 of the active pattern may be included in a first thin film transistor TFT1.

The second gate electrode, the second source electrode, the second drain electrode, the second active area of the active pattern may be included in a second thin film transistor TFT2.

The third gate electrode, the third source electrode, the third drain electrode, the third active area of the active pattern may be included in a third thin film transistor TFT3.

The second insulation layer 120 may be disposed on first insulation layer 110 on which the data line DL and the voltage dividing reference voltage line RDL are disposed. The second insulation layer 120 may include a silicon compound, metal oxide, etc. For example, the second insulation layer 120 may be formed using silicon oxide (SiOx), silicon nitride (SiNx), silicon oxynitride (SiOxNy), aluminum oxide (AlOx), tantalum oxide (TaOx), hafnium oxide (HfOx), zirconium oxide (ZrOx), titanium oxide (TiOx), etc. These may be used alone or in a combination thereof. In addition, the second insulation layer 120 may have a single layer structure or a multi layer structure including the silicon oxide and/or the silicon nitride. In example embodiments, the second insulation layer 120 may have a relatively large thickness for sufficiently covering the data line DL and the voltage dividing reference voltage line RDL, so that the second insulation layer 120 may have a substantially flat upper surface. In some example embodiments, the second insulation layer 120 may be uniformly formed on the first insulation layer 110 along a profile of the data line DL and the voltage dividing reference voltage line RDL. Here, the second insulation layer 120 may have a substantially small thickness. In some example embodiments, the first insulation layer 110 may have a relatively large thickness for sufficiently covering the gate line GL, the high storage pattern CSTh and the low storage pattern CST1.

The first high electrode EL1*h* may be disposed on the second insulation layer 120. The first high electrode EL1*h* may be electrically connected to the first drain electrode DE1 of the first thin film transistor TFT1 through a contact hole form through the second insulation layer 120. Boundary of the first high electrode EL1*h* may be overlapped with a portion of the high storage pattern CSTh.

The first high electrode EL1*h* may include transparent conductive material. For example, the first high electrode EL1*h* may include indium tin oxide (ITO), indium zinc oxide (IZO) and etc.

The first low electrode EL1*l* may be disposed on the second insulation layer 120. The first low electrode EL1*l* may be spaced apart from the first high electrode EL1*h* in the second direction D2. The first low electrode EL1*l* may be electrically connected to the second drain electrode of the second thin film transistor TFT2 and the third source electrode of the third transistor though a contact hole form through the second insulation layer 120. Boundary of the first low electrode EL1*l* may be overlapped with a portion of the low storage pattern CST1.

The first low electrode EL1*l* may include transparent conductive material. For example, the first low electrode EL1*l* may include indium tin oxide (ITO), indium zinc oxide (IZO) and etc.

The third electrode EL3 may be disposed on the second insulation layer 120, and spaced apart from the first high electrode EL1*h* and the first low electrode EL1*l* in the first direction D1. The third electrode EL3 may extend in the second direction D2. The third electrode EL3 may overlap the voltage dividing reference voltage line RDL and a data line of an adjacent pixel. On or off voltage may be applied to the third electrode EL3 for converting a transparent mode to a normal mode and vise versa. The third electrode EL3 may extend in the first direction D1, and may be electrically connected to a third electrode of the adjacent pixel through a connecting electrode which is disposed between the first high electrode EL1*h* and the first low electrode EL1*l*.

The third electrode EL3 may include transparent conductive material. For example, the third electrode EL3 may include indium tin oxide (ITO), indium zinc oxide (IZO) and etc.

The second base substrate 200 may be disposed to face the first substrate 100. The second base substrate 200 may include a transparent insulation substrate. For example, the second base substrate 200 may include a glass substrate, a quartz substrate, a transparent resin substrate, etc. Examples of the transparent resin substrate for the second base substrate 200 may include polyimide-based resin, acryl-based resin, polyacrylate-based resin, polycarbonate-based resin, polyether-based resin, sulfonic acid containing resin, polyethyleneterephthalate-based resin, etc.

The light blocking pattern BM may be disposed on the second base substrate 200. The light blocking pattern BM may include a material which blocks light. The light blocking pattern BM may overlap the first to third thin film transistors TFT1, TFT2 and TFT3.

The color filter 210 may be disposed on the second substrate 200 on which the light blocking pattern BM is disposed. The color filter 210 supplies colors to the light passing through the liquid crystal layer 300. The color filter 210 may include a red color filter, a green color filter and blue color filter. The color filter 210 corresponds to the pixel. The color filters adjacent to each other may have different colors. The color filter 210 may be overlapped with adjacent color filter in a boundary of the adjacent pixels. In addition, the color filter 210 may be spaced apart from adjacent color filter in the boundary of the adjacent pixels.

The color filter 210 may be disposed not to overlap the first electrode EL1. The color filter 210 may be spaced apart from the third electrode EL3 in a plan view.

The over-coating layer 220 may be disposed on the color filter 210 and the light blocking pattern BM. The over-coating layer 220 may flatten, protect, and insulate the color filter CF. The over-coating layer 220 may include acrylic-epoxy material.

The second electrode EL2 may be disposed on the over-coating layer 220. The second electrode EL2 may face the first high electrode EL1*h* and the first low electrode EL1*l*. In addition, the second electrode EL2 may face the third electrode EL3. A common voltage may be applied to the second electrode EL2. The second electrode EL2 may include a transparent conductive material. For example, the second electrode EL2 may include indium tin oxide (ITO), indium zinc oxide (IZO) and etc.

The liquid crystal layer 300 may be disposed between the first high and low electrodes EL1*h* and EL1*l* and the second electrode EL2. In addition, the liquid crystal layer 300 may be disposed between the third electrode EL3 and the second electrode EL2. The liquid crystal layer 300 includes liquid crystal molecules having optical anisotropy. The liquid crystal molecules are driven by electric field, so that an image is displayed by passing or blocking light through the liquid crystal layer 300.

In the transparent mode, the on voltage is applied to the third electrode EL3, and the common voltage is applied to the second electrode EL2. Accordingly, the liquid crystal layer 300 passes light, so that the display panel can work as a transparent display.

In the normal mode, the off voltage is applied to the third electrode EL3, and the common voltage is applied to the second electrode EL2. Accordingly, the liquid crystal layer 300 blocks light, so that the display panel can work as a traditional display. Here, a portion of the liquid crystal layer 300, which corresponds to the third electrode EL3, blocks the light, so that the portion may work as a light blocking portion.

When a display apparatus having the display panel is embodied in a normally black mode, difference between the off voltage and the common voltage may be less than about 1.5V. The off voltage may preferably be same value as the common voltage. In the namely black mode, the display panel displays a black image when voltage difference between upper surface and lower surface of the liquid crystal layer is zero, and the display panel displays an image which is formed by light passing the liquid crystal layer when the voltage difference between upper surface and lower surface of the liquid crystal layer is not zero. Thus, the portion of the liquid crystal layer 300, which corresponds to the third electrode EL3 may pass or block light according to the transparent and normal modes.

Although the display apparatus works in a normally black mode in the present example embodiment, the display apparatus may work in a normally white mode in a similar manner as that of the present example embodiment.

In addition, transparency may be controlled by adjusting the voltage level applied to the third electrode EL3. The voltage level may be between the on voltage and the off voltage.

Figure 3:
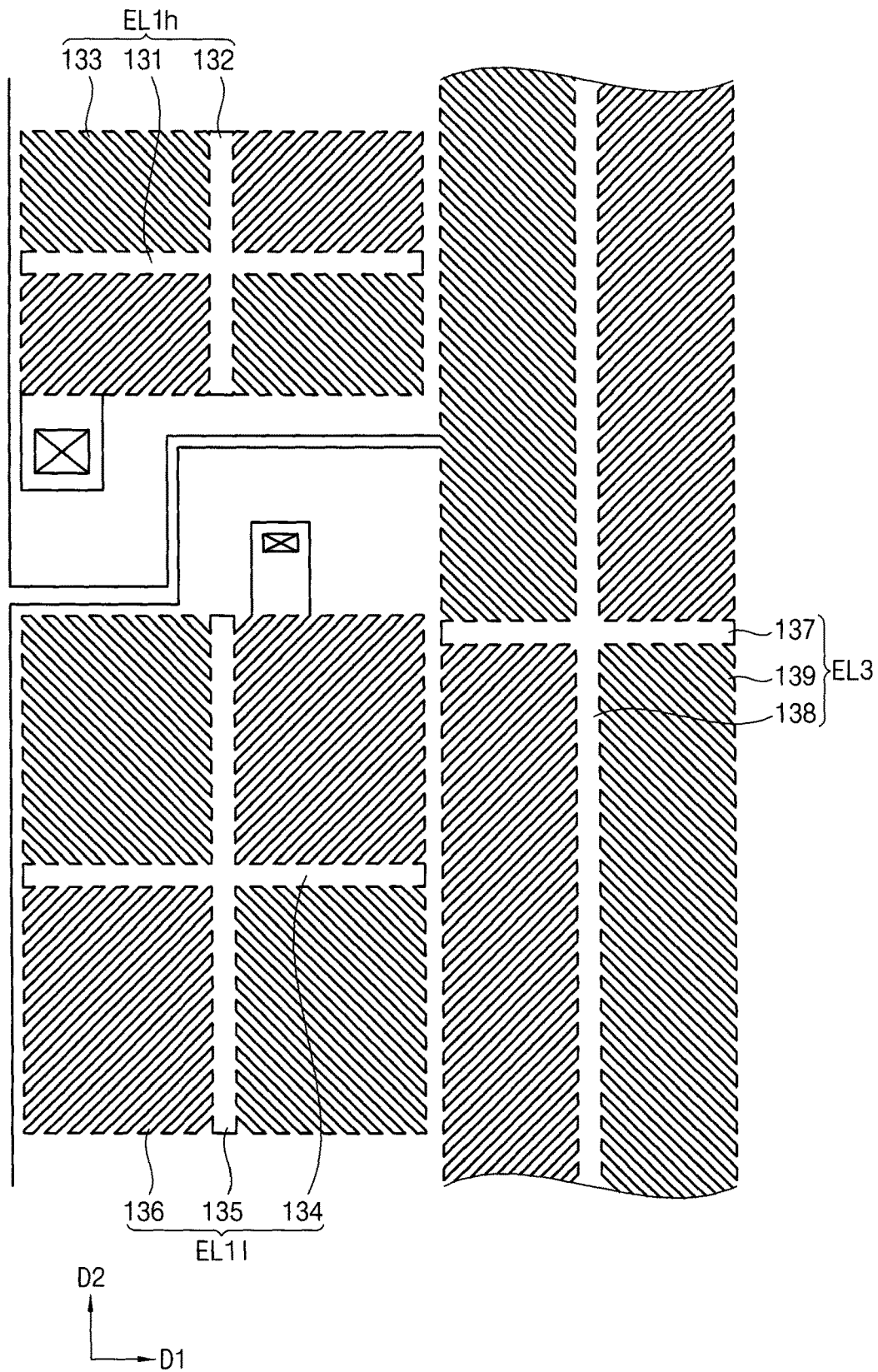
FIG. 3 is a plan view illustrating a first high electrode, a first low electrode and third electrode of the display panel of FIG. 1 in detail.

FIG. 3 is a plan view illustrating the first high electrode EL1*h*, the first low electrode EL1*l* and the third electrode EL3 of the display panel of FIG. 1 in detail.

Referring to FIG. 3, each of the first high electrode EL1*h*, the first low electrode EL1*l* and the third electrode EL3 may have slit structure. The first high electrode EL1*h* and the first low electrode EL1*l* are sometimes called the first high pixel electrode EL1*h* and the first low pixel electrode EL1*l*.

The first high pixel electrode EL1*h* may include a first stem 131, a second stem 132 and a plurality of slit portions 133. The first stem 131 may extend in a first direction D1. The second stem 132 may extend in a second direction D2 crossing the first direction D1. The slit portion 133 may be extended from the first stem 131 or the second stem 132 in a direction which is inclined with respect to the first and second directions D1 and D2. The slit portion 133 may form a plurality of slits.

The first low pixel electrode EL1*l* may include a first stem 134, a second stem 135 and a plurality of slit portions 136. The first stem 134 may extend in the first direction D1. The second stem 135 may extend in the second direction D2. The slit portion 136 may be extended from the first stem 134 or the second stem 135 in a direction which is inclined with respect to the first and second directions D1 and D2. The slit portion 136 may form a plurality of slits.

The third electrode EL3 may include a first stem 137, a second stem 138 and a plurality of slit portions 139. The first stem 137 may extend in the first direction D1. The second stem 138 may extend in the second direction D2. The slit portion 139 may be extended from the first stem 137 or the second stem 138 in a direction which is inclined with respect to the first and second directions D1 and D2. The slit portion 139 may form a plurality of slits.

Control for the liquid crystal molecules of the liquid crystal layer may be improved by the slit structure, so that visibility of the display panel may be improved.

Although the third electrode EL3 has the slit structure in the present embodiment, it is not to be construed as limiting thereof. For example, the third electrode EL3 may have a planer shape without the slit structure.

Figure 4:
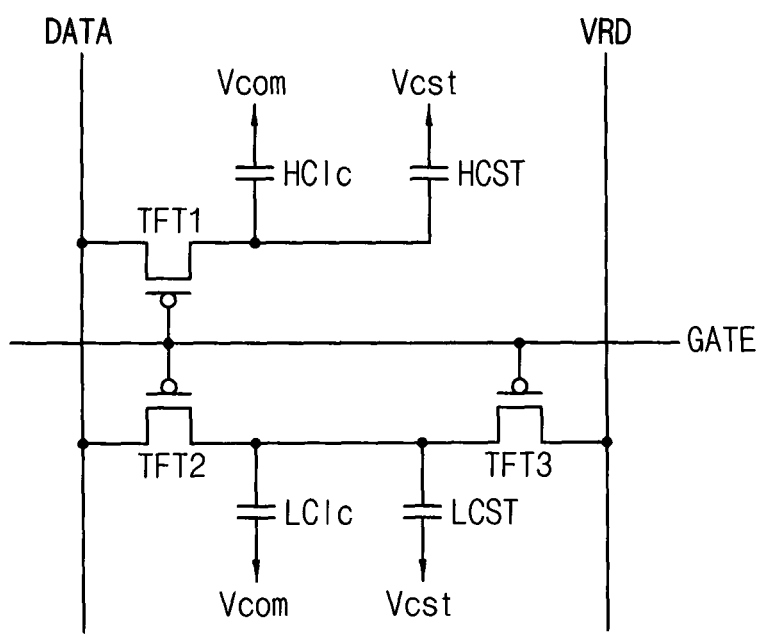
FIG. 4 is an equivalent circuit diagram of the pixel of FIG. 1.

FIG. 4 is an equivalent circuit diagram of the pixel of FIG. 1.

Referring to FIGS. 4 and 1, the pixel of the display panel may include a plurality of signal lines, first, second, and third thin film transistors TFT1, TFT2 and TFT3 which are electrically connected to the signal lines, a high liquid crystal capacitor HClc, a low liquid crystal capacitor LClc, a high storage capacitor HCST, and a low storage capacitor LCST. The signal lines may include a gate line GL, a high storage pattern CSTh, a low storage pattern CSTl, a data line DL and a dividing reference voltage line RDL. The high storage pattern CSTh, a first high electrode EL1h and first and second insulation layers 110 and 120 therebetween may form the high storage capacitor HCST. The low storage pattern CSTl, a first low electrode EL1l and the second insulation layers 110 and 120 therebetween may form the low storage capacitor LCST.

A gate signal GATE may be applied to the gate line GL. A data signal DATA may be applied to the data line DL. A dividing reference voltage VRD may be applied to the voltage dividing reference voltage line RDL. A common voltage Vcom may be applied to the second electrode EL2. A storage voltage Vcst may be applied to the high storage pattern CSTh. The storage voltage Vcst may be applied to the low storage pattern CSTl. In some example embodiment, a voltage applied to the high storage pattern CSTh and a voltage applied to the low storage pattern CSTl may be different from each other.

When a gate on signal is applied to the gate line GL, the first thin film transistor TFT1, the second thin film transistor TFT2 and the third thin film transistor TFT3 may be turned on. Accordingly, a data voltage applied to the data line DL may be applied to the first high electrode EL1h though the first thin film transistor TFT1 which is turned on. Here, the high liquid crystal capacitor HClc may be charged by a difference between the common voltage Vcom and the data voltage. At the same time, the data voltage may be divided by the second thin film transistor TFT2 which is turned on, and the third thin film transistor TFT3 which is turned on, and charged to the low liquid crystal capacitor LClc. A charged value of the low liquid crystal capacitor LClc may be lower than that of the high liquid crystal capacitor HClc. Thus, control of liquid crystal molecules may be improved, so that side visibility of the display panel may be improved.

Figure 5:
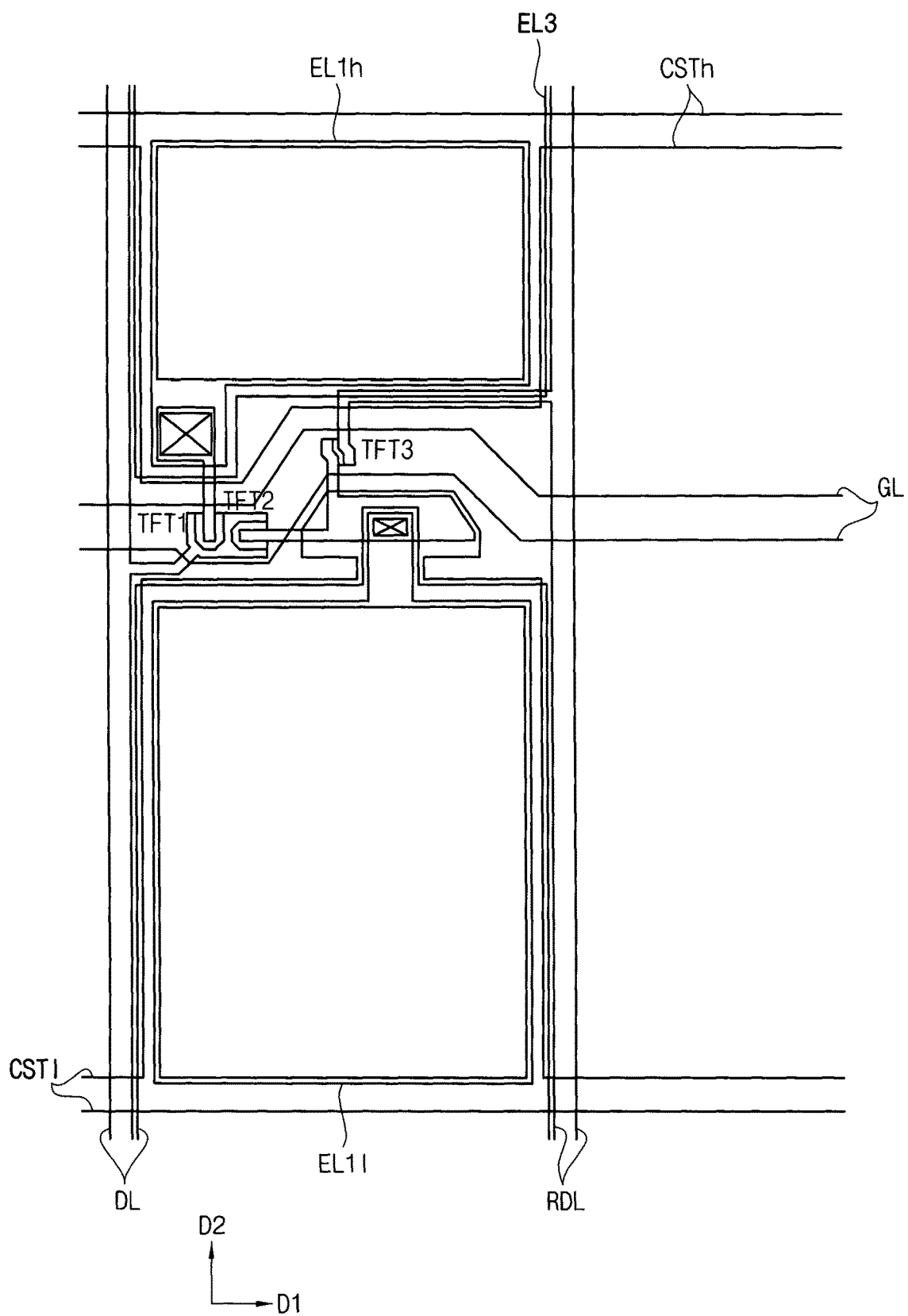
FIG. 5 is a plan view illustrating one pixel of a display panel according to an exemplary embodiment of the inventive concept.

FIG. 5 is a plan view illustrating one pixel of a display panel according to an exemplary embodiment of the inventive concept.

Referring to FIG. 5, the display panel may be substantially same as the display panel of FIG. 1, except for a shape of a third electrode EL3, and presence or absence of a light blocking pattern. Thus, any further detailed descriptions concerning the same elements will be briefly explained or omitted.

The display panel may include a first base substrate, a gate line GL, a high storage pattern CSTh, a low storage pattern CSTl, a first insulation layer, a data line DL, a voltage dividing reference voltage line RDL, a second insulation layer, a first high electrode EL1h, a first low electrode EL1l, a third electrode EL3, a second base substrate, a color filter, an over-coating layer, a second electrode and a liquid crystal layer.

The first base substrate may include a transparent insulation substrate. The gate line GL may be disposed on the first base substrate. The high storage pattern CSTh may be disposed on the first base substrate. The low storage pattern CSTl may be disposed on the first base substrate. The first insulation layer may be disposed on the first base substrate on which the gate line GL, the high storage pattern CSTh and the low storage pattern CSTl are disposed. An active pattern may be disposed on the first insulation layer. The data line DL may be disposed on the first insulation layer. The voltage dividing reference voltage line RDL may be disposed on the first insulation layer. The second insulation layer may be disposed on first insulation layer on which the data line DL and the voltage dividing reference voltage line RDL are disposed. The first high electrode EL1h may be disposed on the second insulation layer. The first low electrode EL1l may be disposed on the second insulation layer. The third electrode EL3 may be disposed on the second insulation layer. The second base substrate may be disposed to face the first substrate. The color filter may be disposed on the second substrate. The over-coating layer may be disposed on the color filter. The second electrode may be disposed on the over-coating layer. The liquid crystal layer may be disposed between the first high and low electrodes EL1h and EL1l and the second electrode EL2.

The gate line GL may extend in a first direction D1. The high storage pattern CSTh may be electrically connected to a high storage pattern of an adjacent pixel in the first direction D1. The low storage pattern CSTl may be electrically connected to a low storage pattern of the adjacent pixel in the first direction D1.

The second data line DL may extend in a second direction D2 which crosses the first direction D1. The second direction D2 may be substantially perpendicular to the first direction D1. The voltage dividing reference voltage line RDL may be spaced apart from the data line DL in the first direction D1, and extend in the second direction D2.

The first high electrode EL1h may be electrically connected to a first drain electrode of the first thin film transistor TFT1 through a contact hole formed through the second insulation layer. A boundary of the first high electrode EL1h may be overlapped with a portion of the high storage pattern CSTh.

The first high electrode EL1h may include transparent conductive material. For example, the first high electrode EL1h may include indium tin oxide (ITO), indium zinc oxide (IZO) and etc.

The first low electrode EL1l may be spaced apart from the first high electrode EL1h in the second direction D2. The first low electrode EL1l may be electrically connected to a second drain electrode of the second thin film transistor TFT2 and a third source electrode of the third transistor TFT3 through a contact hole formed through the second insulation layer. A boundary of the first low electrode EL1l may be overlapped with a portion of the low storage pattern CSTl.

The first low electrode EL1l may include transparent conductive material. For example, the first low electrode EL1l may include indium tin oxide (ITO), indium zinc oxide (IZO) and etc.

The third electrode EL3 may be spaced apart from the first high electrode EL1h and the first low electrode EL1l. The third electrode EL3 may extend in the second direction D2. The third electrode EL3 may overlap the voltage dividing reference voltage line RDL and a data line of an adjacent pixel. On or off voltage may be applied to the third electrode EL3 for converting a transparent mode to a normal mode and vise versa. The third electrode EL3 may extend in the first direction D1, and may be electrically connected to a third electrode of the adjacent pixel. The third electrode EL3 may overlap the first to third thin film transistors TFT1, TFT2 and TFT3. Thus, the third electrode EL3 may block light in the normal mode. Accordingly, an additional light blocking pattern needs not to be formed on a color filter substrate.

The third electrode EL3 may include transparent conductive material. For example, the third electrode EL3 may include indium tin oxide (ITO), indium zinc oxide (IZO) and etc.

Figure 6:
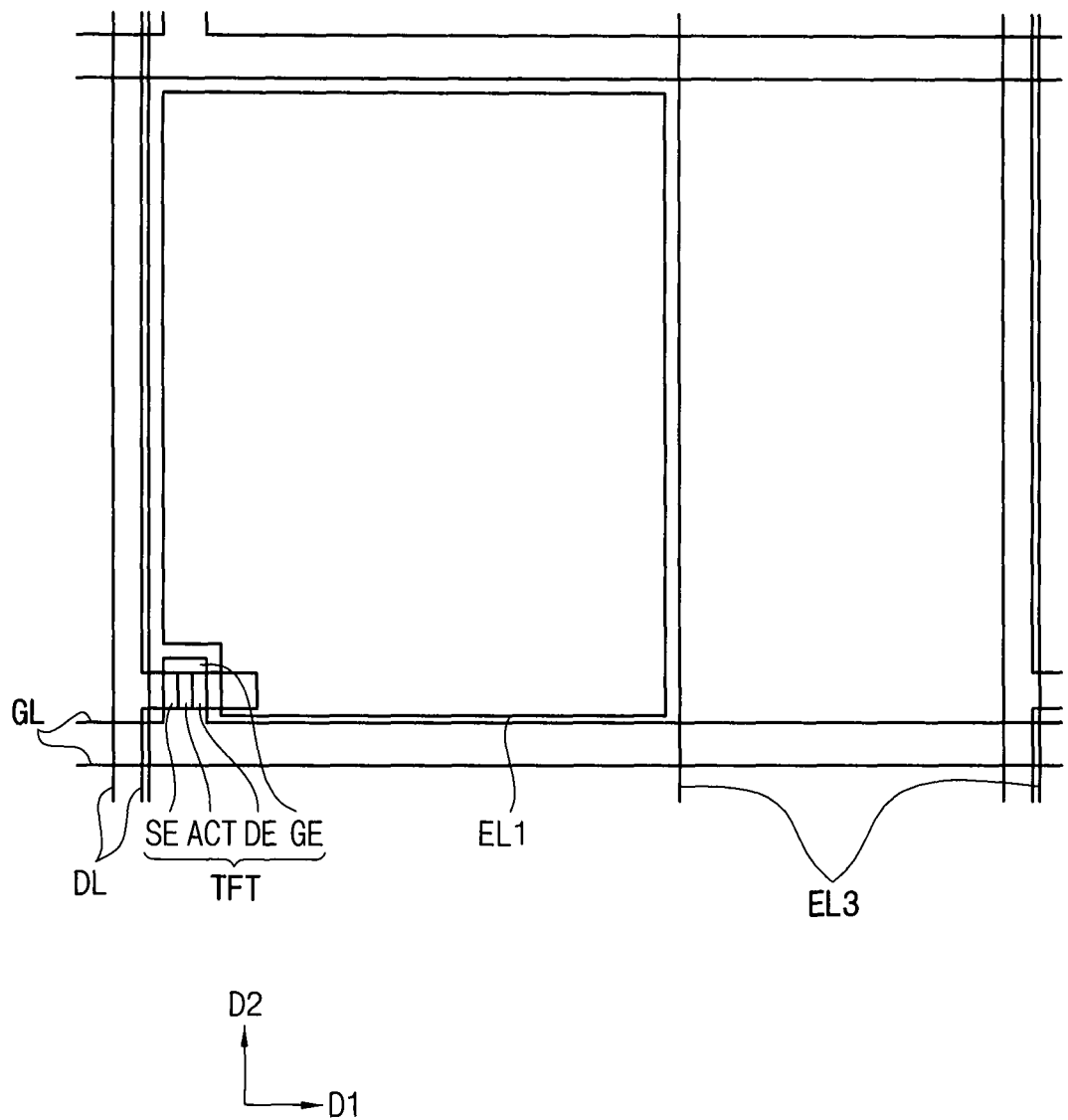
FIG. 6 is a plan view illustrating one pixel of a display panel according to an exemplary embodiment of the inventive concept.

FIG. 6 is a plan view illustrating one pixel of a display panel according to an exemplary embodiment of the inventive concept.

Referring to FIG. 6, the display panel may include a gate line GL, a data line DL, a first electrode EL1, a third electrode EL3, a thin film transistor TFT, and a second electrode. The thin film transistor TFT may include a source electrode SE, an active pattern ACT, a drain electrode DE and a gate electrode GE.

The gate line GL may extend in a first direction D1. The gate line GL may be electrically connected to the gate electrode GE of the thin film transistor TFT.

The data line DL may extend in a second direction D2 crossing the first direction D1. The second direction D2 may be substantially perpendicular to the first direction D1. The data line DL may be electrically connected to the source electrode SE of the thin film transistor TFT.

The first electrode EL1 may be electrically connected to the drain electrode DE of the thin film transistor TFT. The first electrode EL1 may include transparent conductive material. For example, the first electrode EL1 may include indium tin oxide (ITO), indium zinc oxide (IZO) and etc.

The third electrode EL3 may be spaced apart from the first electrode EL1. The third electrode EL3 may extend in the second direction D2. On or off voltage may be applied to the third electrode EL3 for converting a transparent mode to a normal mode and vise versa. The third electrode EL3 may include transparent conductive material. For example, the third electrode EL3 may include indium tin oxide (ITO), indium zinc oxide (IZO) and etc. The first electrode EL1 and the third electrode EL3 may be formed from a same layer and have a same material. In addition, the first electrode EL1 and the third electrode EL3 may be formed from the same layer, so that the first electrode EL1 and the third electrode EL3 may be disposed on a same plane.

The second electrode may be disposed to face the first electrode EL1 and the third electrode EL3. The second electrode may overlap the first and third electrode EL1 and EL3.

The liquid crystal layer may be disposed between the first electrode EL1 and the second electrode, and between the third electrode EL3 and the second electrode.

Figure 7:
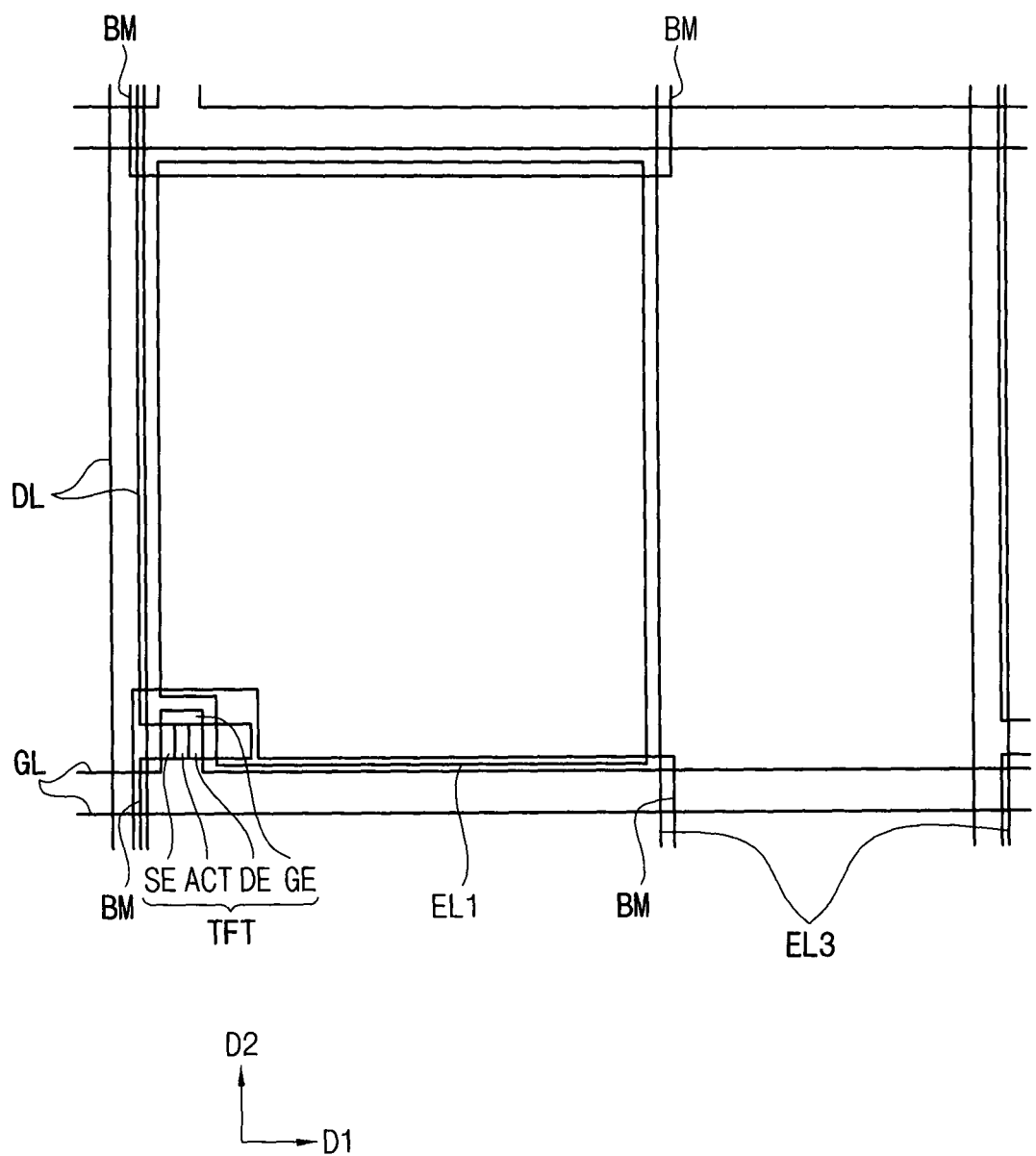
FIG. 7 is a plan view illustrating one pixel of a display panel according to an exemplary embodiment of the inventive concept.

FIG. 7 is a plan view illustrating one pixel of a display panel according to an exemplary embodiment of the inventive concept.

Referring to FIG. 7, the display panel may be substantially same as the display panel of FIG. 6, except for a light blocking pattern BM. Thus, any further detailed descriptions concerning the same elements will be briefly explained or omitted.

The display panel may include a gate line GL, a data line DL, a first electrode EL1, a third electrode EL3, a thin film transistor TFT, a second electrode and a light blocking pattern BM. The thin film transistor TFT may include a source electrode SE, an active pattern ACT, a drain electrode DE and a gate electrode GE.

The gate line GL may extend in a first direction D1. The gate line GL may be electrically connected to the gate electrode GE of the thin film transistor TFT.

The data line DL may extend in a second direction D2 crossing the first direction D1. The second direction D2 may be substantially perpendicular to the first direction D1. The data line DL may be electrically connected to the source electrode SE of the thin film transistor TFT.

The first electrode EL1 may be electrically connected to the drain electrode DE of the thin film transistor TFT. The first electrode EL1 may include transparent conductive material.

The third electrode EL3 may be spaced apart from the first electrode EL1. The third electrode EL3 may extend in the second direction D2. On or off voltage may be applied to the third electrode EL3 for converting a transparent mode to a normal mode and vise versa. The third electrode EL3 may include a transparent conductive material. The third electrode EL3 may be entirely overlapped with a data line of an adjacent pixel. In some example embodiments, the third electrode EL3 may be partially overlapped with the data line of the adjacent pixel.

The second electrode may be disposed to face the first electrode EL1 and the third electrode EL3. The second electrode may overlap the first and third electrode EL1 and EL3.

The liquid crystal layer may be disposed between the first electrode EL1 and the second electrode, and between the third electrode EL3 and the second electrode.

The light blocking pattern BM may overlap the thin film transistor TFT. The light blocking pattern BM may extend in the first direction D1 configured to cover a portion of the gate line GL.

Figure 8:
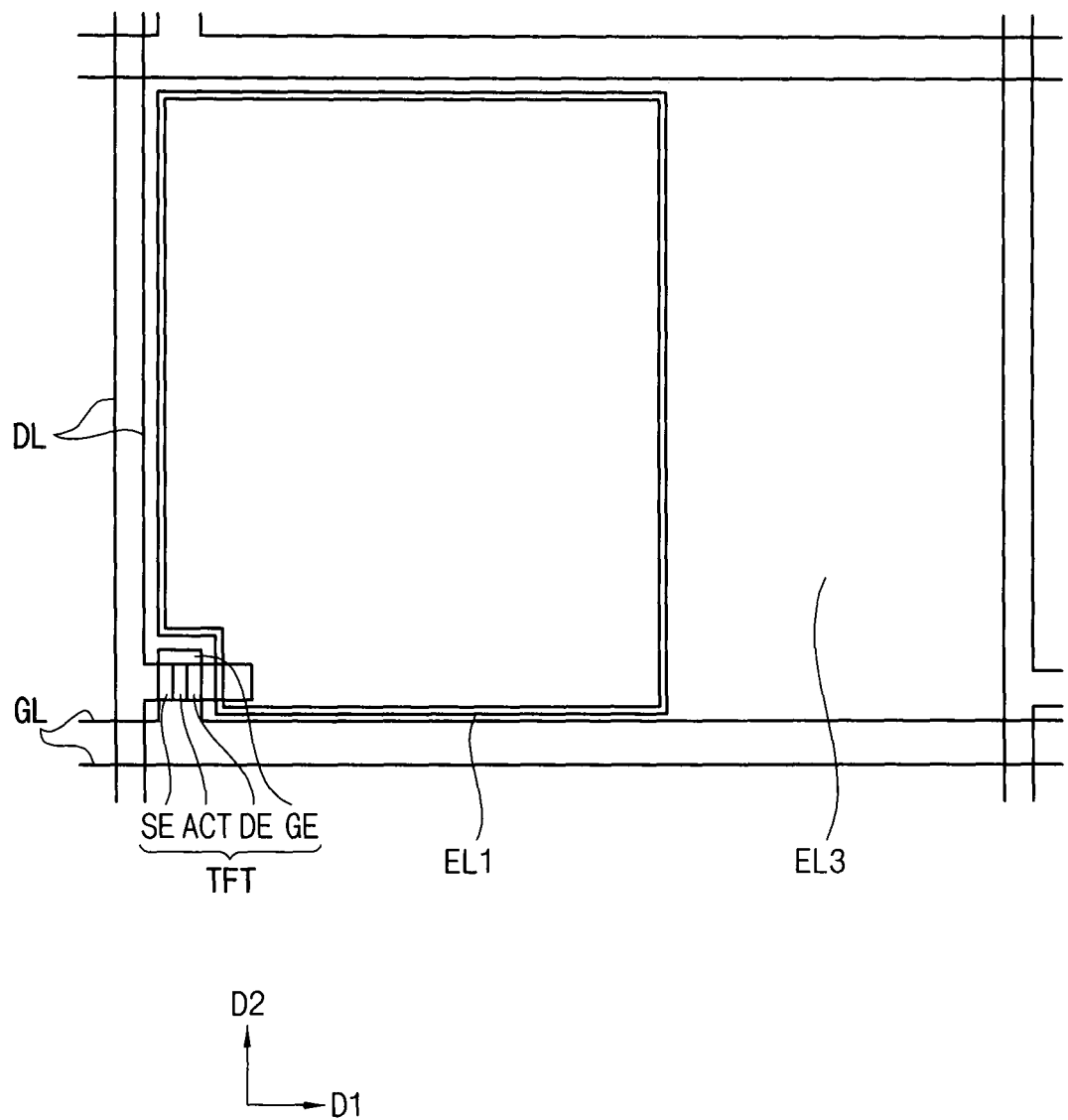
FIG. 8 is a plan view illustrating one pixel of a display panel according to an exemplary embodiment of the inventive concept.

FIG. 8 is a plan view illustrating one pixel of a display panel according to an exemplary embodiment of the inventive concept.

Referring to FIG. 8, the display panel may be substantially same as the display panel of FIG. 6, except for a third electrode EL3. Thus, any further detailed descriptions concerning the same elements will be briefly explained or omitted.

The display panel may include a gate line GL, a data line DL, a first electrode EL1, a third electrode EL3, a thin film transistor TFT, and a second electrode. The thin film transistor TFT may include a source electrode SE, an active pattern ACT, a drain electrode DE and a gate electrode GE.

The gate line GL may extend in a first direction D1. The gate line GL may be electrically connected to the gate electrode GE of the thin film transistor TFT.

The data line DL may extend in a second direction D2 crossing the first direction D1. The second direction D2 may be substantially perpendicular to the first direction D1. The data line DL may be electrically connected to the source electrode SE of the thin film transistor TFT.

The first electrode EL1 may be electrically connected to the drain electrode DE of the thin film transistor TFT. The first electrode EL1 may include transparent conductive material.

The third electrode EL3 may be spaced apart from the first electrode EL1. The third electrode EL3 may extend in the second direction D2. On or off voltage may be applied to the third electrode EL3 for converting a transparent mode to a normal mode and vise versa. The third electrode EL3 may include transparent conductive material.

The third electrode EL3 may be disposed where the first electrode EL1 is not disposed to improve transparency in the transparent mode. For example, the third electrode EL3 may overlap the gate line GL and the data line DL. In addition, the third electrode EL3 may be overlapped with the thin film transistor TFT.

The second electrode may be disposed to face the first electrode EL1 and the third electrode EL3. The second electrode may overlap the first and third electrode EL1 and EL3.

The liquid crystal layer may be disposed between the first electrode EL1 and the second electrode, and between the third electrode EL3 and the second electrode.

Figure 9:
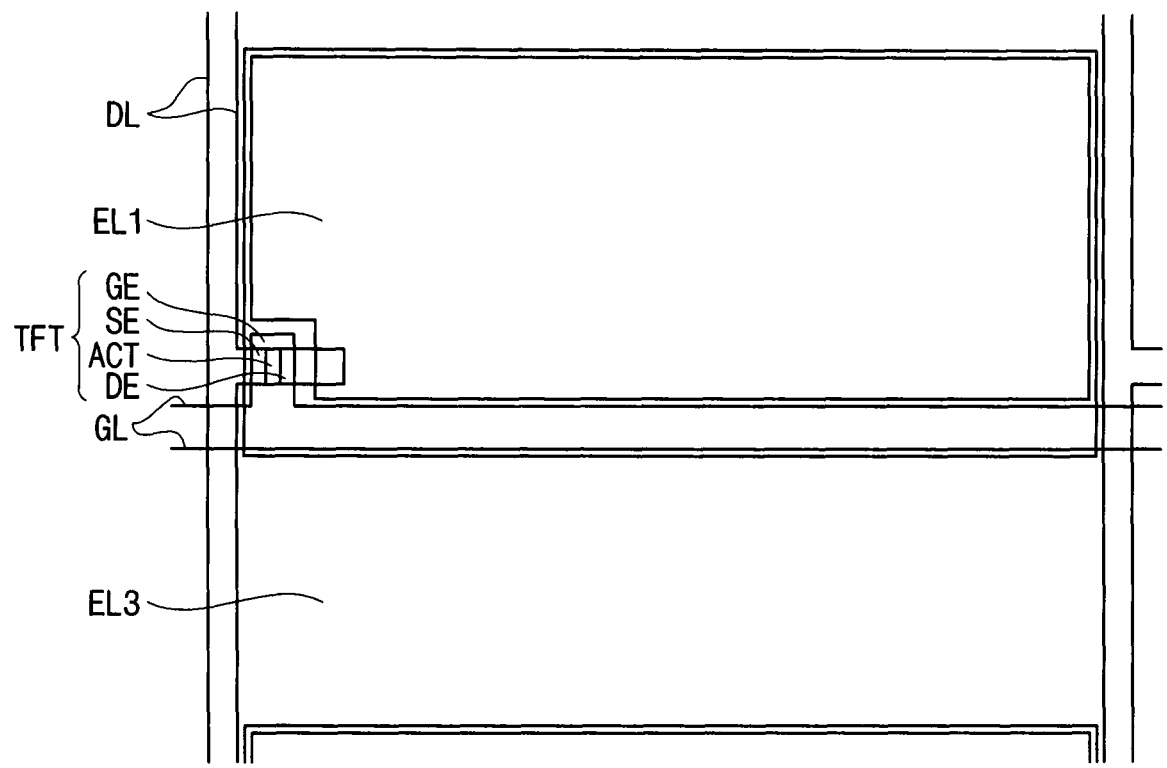
FIG. 9 is a plan view illustrating one pixel of a display panel according to an exemplary embodiment of the inventive concept.
Figure 9:

FIG. 9 is a plan view illustrating one pixel of a display panel according to an exemplary embodiment of the inventive concept.

Referring to FIG. 9, the display panel may be substantially same as the display panel of FIG. 6, except for a third electrode EL3. Thus, any further detailed descriptions concerning the same elements will be briefly explained or omitted.

The display panel may include a gate line GL, a data line DL, a first electrode EL1, the third electrode EL3, a thin film transistor TFT, and a second electrode. The thin film transistor TFT may include a source electrode SE, an active pattern ACT, a drain electrode DE and a gate electrode GE.

The gate line GL may extend in a first direction D1. The gate line GL may be electrically connected to the gate electrode GE of the thin film transistor TFT.

The data line DL may extend in a second direction D2 crossing the first direction D1. The second direction D2 may be substantially perpendicular to the first direction D1. The data line DL may be electrically connected to the source electrode SE of the thin film transistor TFT.

The first electrode EL1 may be electrically connected to the drain electrode DE of the thin film transistor TFT. The first electrode EL1 may include transparent conductive material.

The third electrode EL3 may be spaced apart from the first electrode EL1. The third electrode EL3 may be adjacent to the first electrode EL1 in the second direction D2, and extend in the first direction D1. In addition, a portion of the third electrode EL3 may overlap the data line DL, and extend in the second direction D2, so that the third electrode EL3 may be connected to a third electrode of an adjacent pixel. On or off voltage may be applied to the third electrode EL3 for converting a transparent mode to a normal mode and vise versa. The third electrode EL3 may include transparent conductive material.

The second electrode may be disposed to face the first electrode EL1 and the third electrode EL3. The second electrode may overlap the first and third electrode EL1 and EL3.

The liquid crystal layer may be disposed between the first electrode EL1 and the second electrode, and between the third electrode EL3 and the second electrode.

Figure 10:
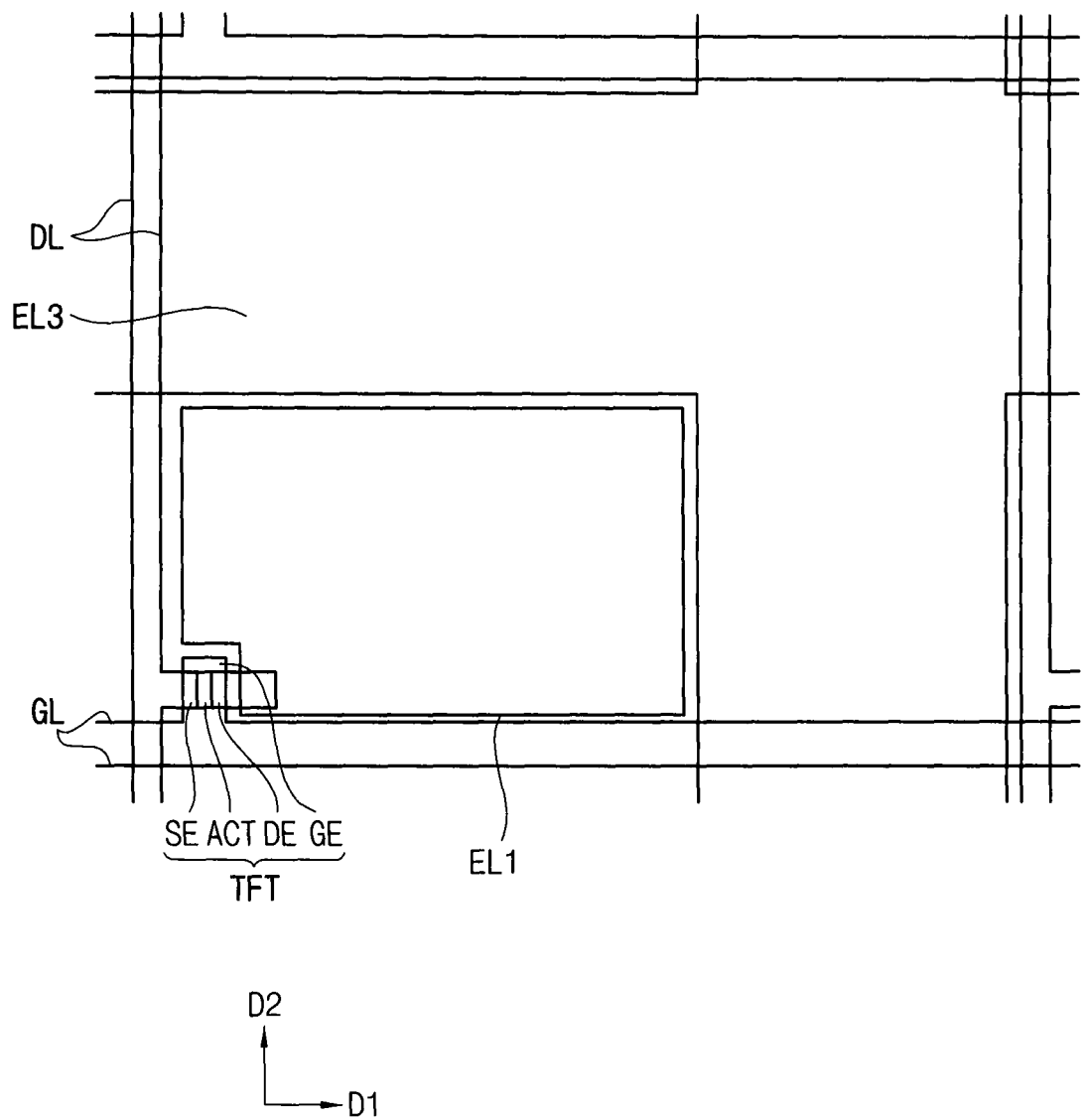
FIG. 10 is a plan view illustrating one pixel of a display panel according to an exemplary embodiment of the inventive concept.

FIG. 10 is a plan view illustrating one pixel of a display panel according to an exemplary embodiment of the inventive concept.

Referring to FIG. 10, the display panel may be substantially same as the display panel of FIG. 6, except for a third electrode EL3. Thus, any further detailed descriptions concerning the same elements will be briefly explained or omitted.

The display panel may include a gate line GL, a data line DL, a first electrode EL1, a third electrode EL3, a thin film transistor TFT, and a second electrode. The thin film transistor TFT may include a source electrode SE, an active pattern ACT, a drain electrode DE and a gate electrode GE.

The gate line GL may extend in a first direction D1. The gate line GL may be electrically connected to the gate electrode GE of the thin film transistor TFT.

The data line DL may extend in a second direction D2 crossing the first direction D1. The second direction D2 may be substantially perpendicular to the first direction D1. The data line DL may be electrically connected to the source electrode SE of the thin film transistor TFT.

The first electrode EL1 may be electrically connected to the drain electrode DE of the thin film transistor TFT. The first electrode EL1 may include transparent conductive material.

The third electrode EL3 may be spaced apart from the first electrode EL1. The third electrode EL3 may extend in the first direction D1 and the second direction D2 to form a mesh structure. On or off voltage may be applied to the third electrode EL3 for converting a transparent mode to a normal mode and vise versa. The third electrode EL3 may include transparent conductive material.

The second electrode may be disposed to face the first electrode EL1 and the third electrode EL3. The second electrode may overlap the first and third electrode EL1 and EL3.

The liquid crystal layer may be disposed between the first electrode EL1 and the second electrode, and between the third electrode EL3 and the second electrode.

FIGS. 11A to 15B are plan views and cross-sectional views illustrating a method of manufacturing the display panel of FIG. 1.

Figure 11A:
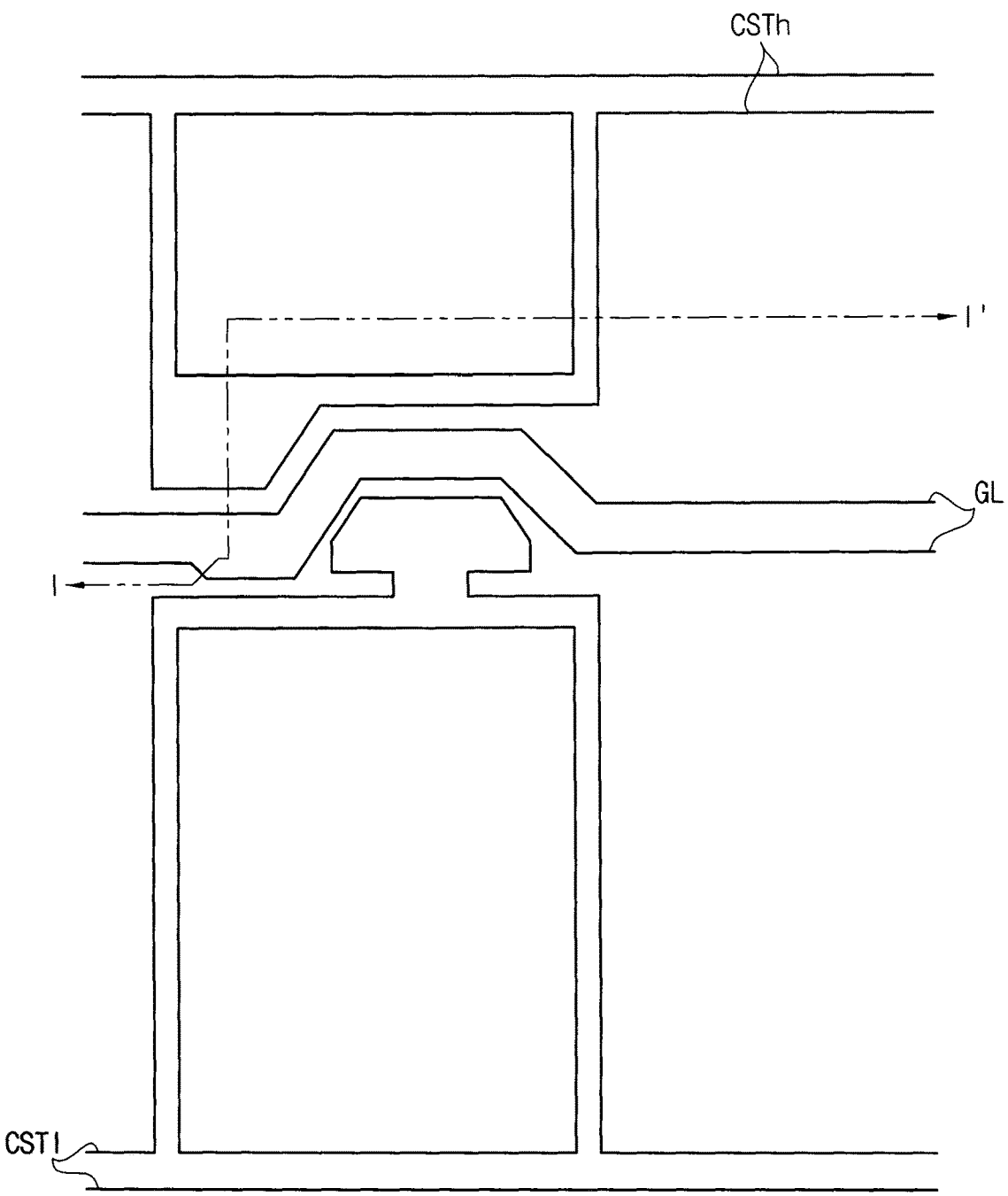
FIGS. 11A, 11B, 12A, 12B, 13A, 13B, 14, 15A and 15B are plan views and cross-sectional views illustrating a method of manufacturing the display panel of FIG. 1.
Figure 11A:
Figure 11B:
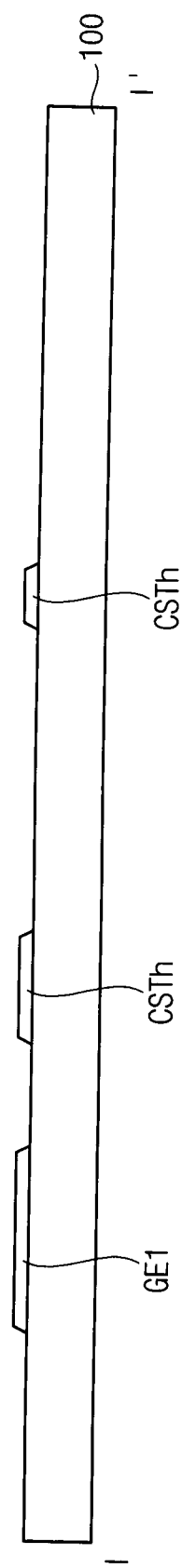

Referring to FIGS. 11A and 11B, a gate pattern may be formed on a first substrate 100. A conductive layer (not shown) may be formed on the first base substrate 100, and then the conductive layer may be partially etched by a photolithography process or an etching process using an additional mask. Hence, the gate pattern may be obtained.

The gate pattern may include a gate line GL, a high storage pattern CSTh and a low storage pattern CSTl. The gate line GL may be extended in a first direction D1. The gate line GL may be electrically connected to a first gate electrode (refers to GE1 of FIG. 11B). For example, the first gate electrode GE1 may be a portion of the gate line GL. In addition, the gate line GL may be electrically connected to a second gate electrode and a third gate electrode. For example, the second gate electrode and the third gate electrode may be a portion of the gate line GL.

The high storage pattern CSTh may extend in the first direction D1. The high storage pattern CSTh may be electrically connected to a high storage pattern of an adjacent pixel in the first direction D1. The low storage pattern CSTl may extend in the first direction D1. The low storage pattern CSTl may be electrically connected to a low storage pattern of the adjacent pixel in the first direction D1. The gate line GL may be formed between the high storage pattern CSTh and the low storage pattern CSTl.

Figure 12A:
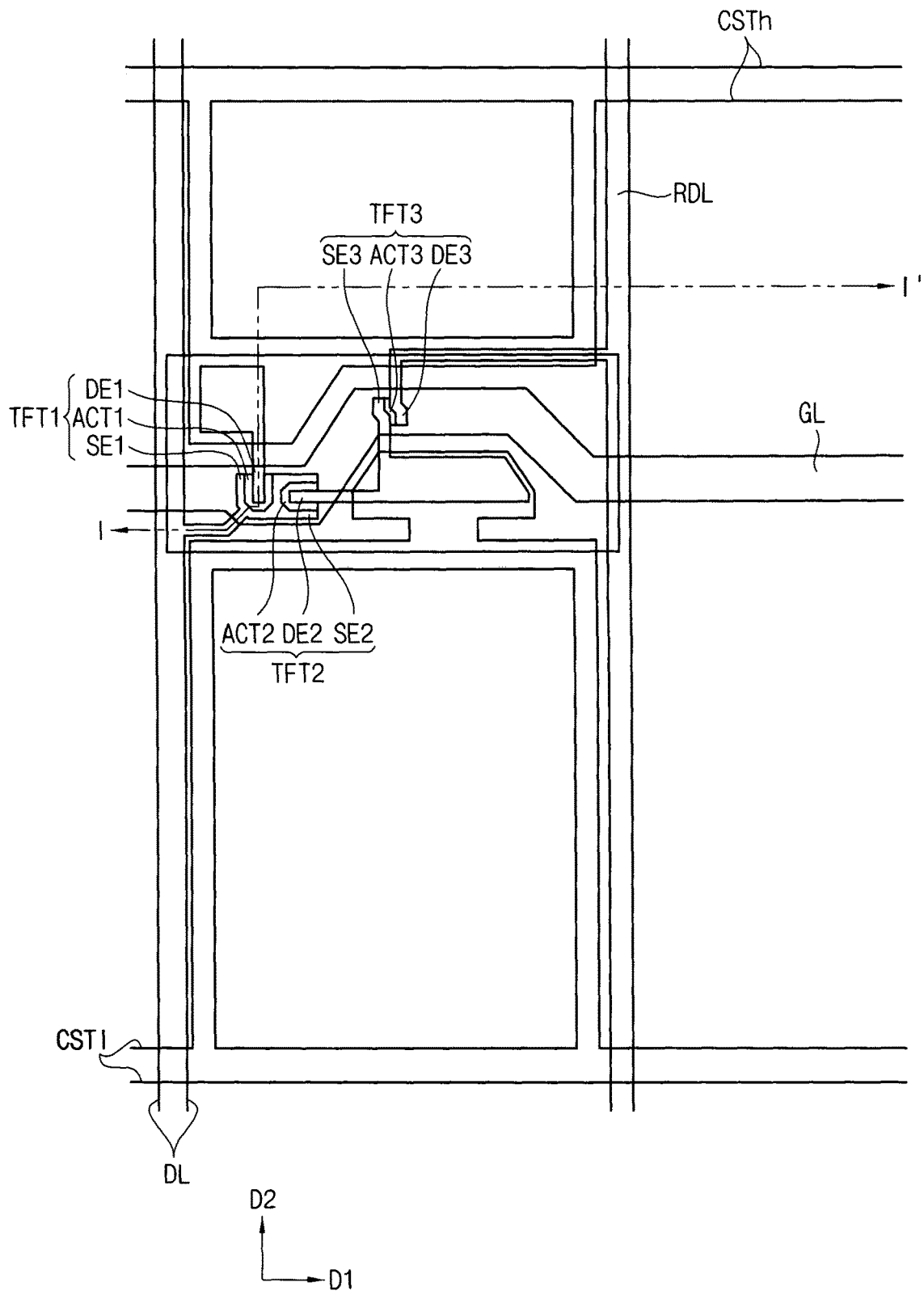
Figure 12B:
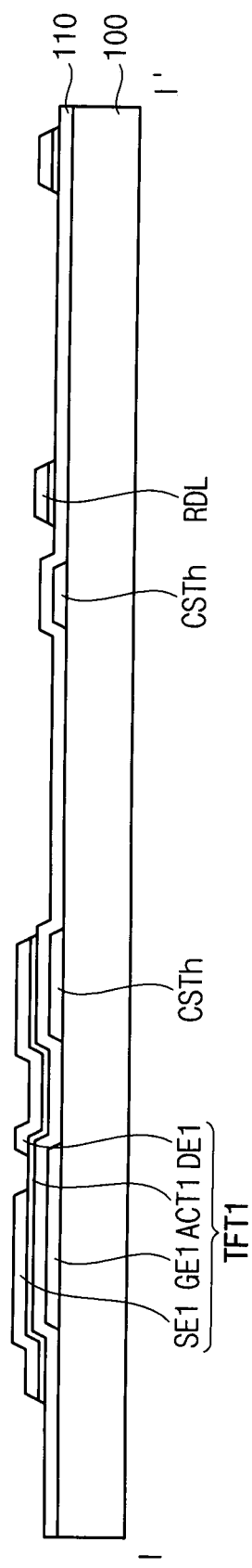

Referring to FIGS. 12A and 12B, the first insulation layer 110 may be formed on the first base substrate 100 on which the gate line GL, the high storage pattern CSTh and the low storage pattern CSTl are formed. The first insulation layer 110 may be formed by a spin coating process, a chemical vapor deposition (CVD) process, a plasma enhanced chemical vapor deposition (PECVD) process, a high density plasma-chemical vapor deposition (HDP-CVD) process, and etc.

An active pattern and a data pattern may be formed on the first insulation layer 110. An active layer (not shown) may be formed on the first insulation layer 110, and then a conductive layer may be formed on the active layer. And then, the active layer and the conductive layer may be simultaneously patterned to form the active pattern and the data pattern. The active layer may include a semiconductor layer consisting of amorphous silicon (a-Si:H) and an ohmic contact layer consisting of n+ amorphous silicon (n+ a-Si: H). In addition, the active pattern may include an oxide semiconductor. The oxide semiconductor may include an amorphous oxide including at least one selected from the group consisting of indium (In), zinc (Zn), gallium (Ga), tin (Sn) and hafnium (Hf).

The active pattern may include a first active area ACT1, a second active area ACT2, and a third active area ACT3.

The data pattern may include a data line DL, a first source electrode SE1, a first drain electrode DE1, a second source electrode SE2, a second drain electrode DE2, a third source electrode SE3, a third drain electrode DE3 and a voltage dividing reference voltage line RDL.

The data line DL may extend in a second direction D2 which crosses the first direction D1. The second direction D2 may be substantially perpendicular to the first direction D1. The data line DL may be electrically connected to the first source electrode SE1 and the second source electrode SE2.

The first source electrode SE1 may be electrically connected to the first active area ACT1. The first drain electrode DE1 may be spaced apart from the first source electrode SE1 and electrically connected to the first active area ACT1.

The second source electrode SE2 may be electrically connected to the second active area ACT2. The second drain electrode DE2 may be spaced apart from the second source electrode SE2 and electrically connected to the second active area ACT2.

The voltage dividing reference voltage line RDL may be spaced apart from the data line DL in the first direction D1, and extend in the second direction D2. The voltage dividing reference voltage line RDL may be electrically connected to the third drain electrode DE3.

The third drain electrode DE3 may be electrically connected to the third active area ACT3. The third source electrode SE3 may be spaced apart from the third drain electrode DE3 and electrically connected to the third active area ACT3. The third source electrode SE3 may be electrically connected to the second drain electrode DE2.

Figure 13A:
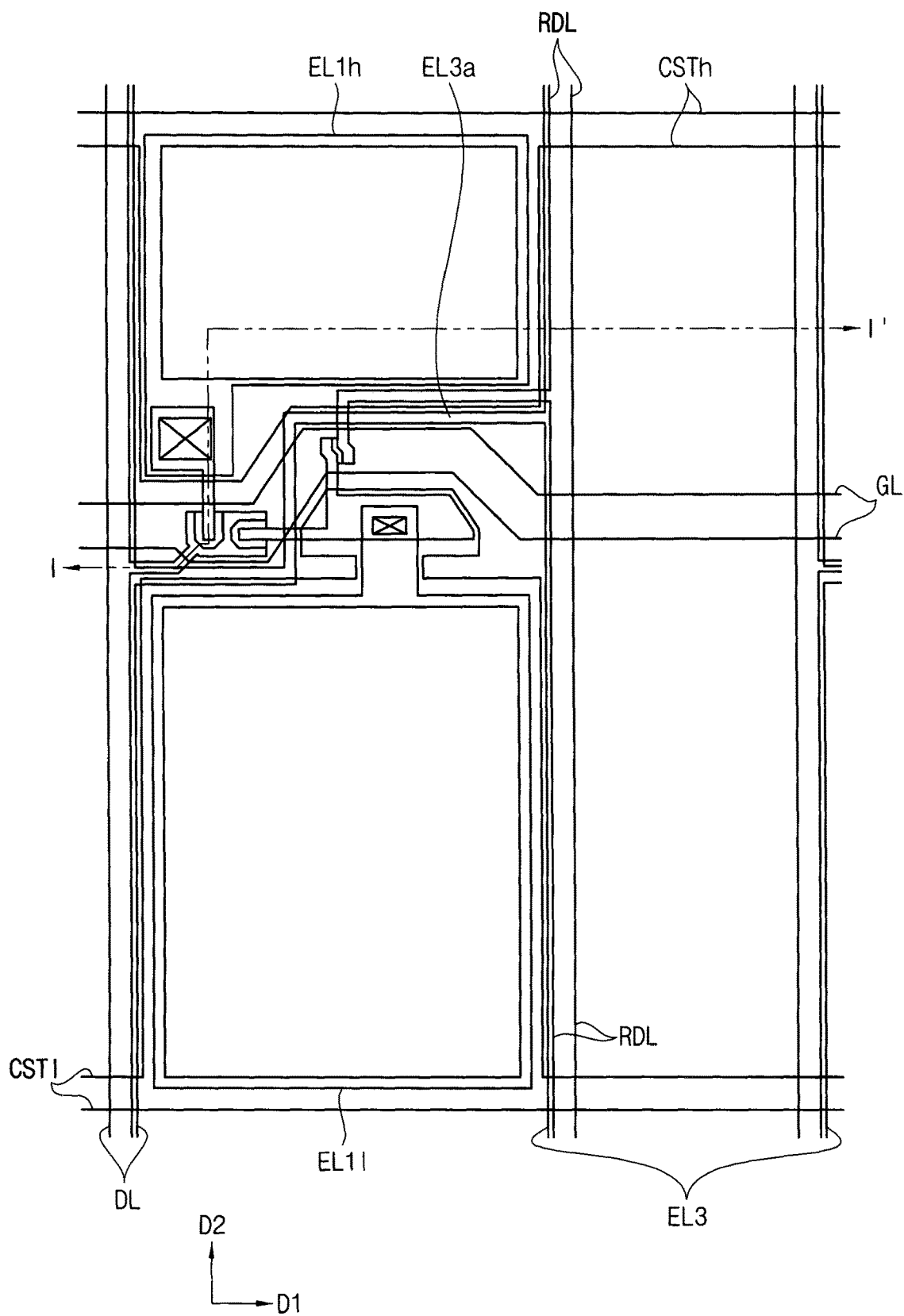
Figure 13B:
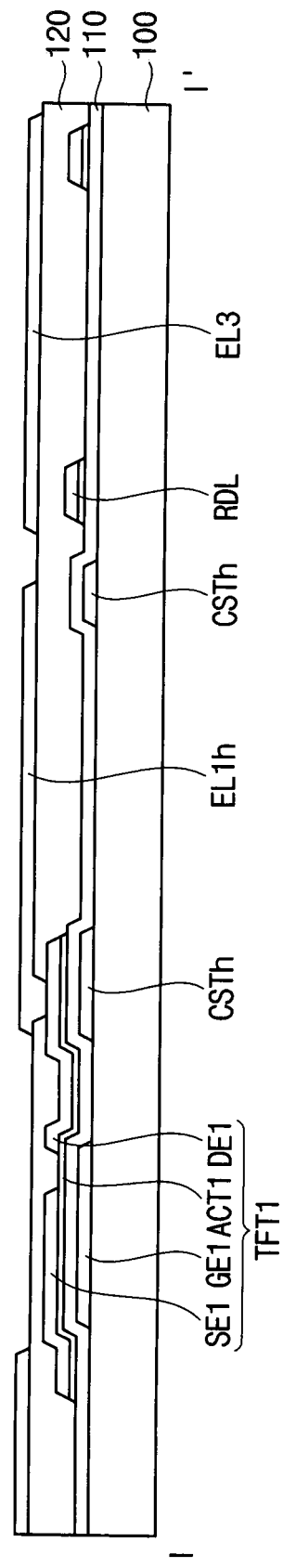

Referring to FIGS. 13A and 13B, a second insulation layer 120 may be formed on the first insulation layer 110 on which the data line DL and the voltage dividing reference voltage line RDL are formed.

The second insulation layer 120 may be formed by a spin coating process, a printing process, a sputtering process, a CVD process, an ALD process, a PECVD process, an HDP-CVD process or a vacuum evaporation process in accordance with ingredients included in the second insulation layer 120.

Contact holes which expose the data pattern may be formed through the second insulation layer 120. The contact holes which extend to and expose the first and second drain electrodes DE1, DE2 of the first and second thin film transistor TFT1 and TFT2 may be formed by partially etching the second insulation layer 120 by a photolithography process or an etching process using an additional mask.

A pixel electrode pattern may be formed on the second insulation layer 120. The pixel electrode pattern may be filled in the contact holes, and formed on the second insulation layer 120. The pixel electrode pattern may include a first high electrode EL1$h$, a first low electrode EL1$l$, and a third electrode EL3. A pixel electrode layer may be formed on the second insulation layer 120, and then the pixel electrode layer may be partially etched by a photolithography process or an etching process using an additional mask. Hence, the pixel electrode pattern may be obtained. The pixel electrode layer may be formed by a printing process, a sputtering process, a CVD process, an ALD process, a vacuum evaporation process, a pulsed laser deposition process, and etc.

The first high electrode EL1$h$ may be electrically connected to the first drain electrode DE1 of the first thin film transistor TFT1 through the contact hole. A boundary of the first high electrode EL1$h$ may be overlapped with a portion of the high storage pattern CSTh.

The first low electrode EL1$l$ may be spaced apart from the first high electrode EL1$h$ in the second direction D2. The first low electrode EL1$l$ may be electrically connected to the second drain electrode DE2 of the second thin film transistor TFT2 and the third source electrode SE3 of the third thin film transistor TFT3 through the contact hole. A boundary of the first low electrode EL1$l$ may be overlapped with a portion of the low storage pattern CSTl.

The third electrode EL3 may be spaced apart from the first high electrode EL1$h$ and the first low electrode EL1$l$ in the first direction D1. The third electrode EL3 may be extended in the second direction D2. The third electrode EL3 may overlap the voltage dividing reference voltage line RDL and a data line of an adjacent pixel. The third electrode EL3 may be extended in the first direction D1, and electrically connected to a third electrode of the adjacent pixel through a connecting electrode EL3$a$ which is disposed between the first high electrode EL1$h$ and the first low electrode EL1$l$.

Figure 14:
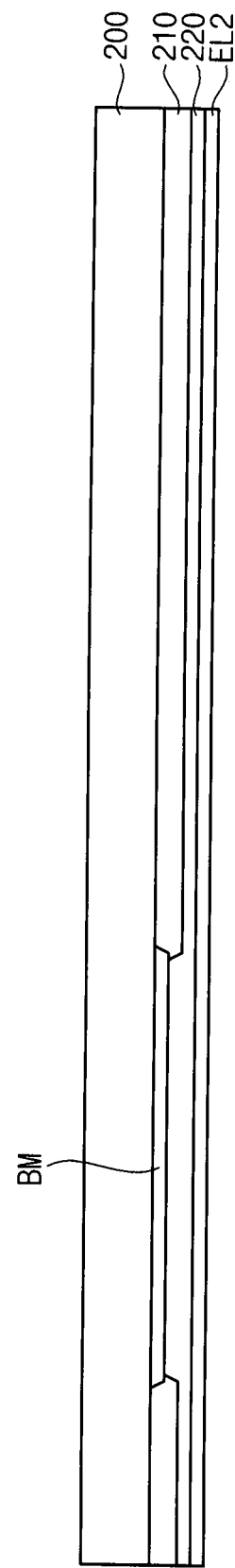

Referring to FIG. 14, a light blocking pattern BM may be formed on a second base substrate 200. The light blocking pattern BM may overlap the first to third thin film transistors TFT1, TFT2 and TFT3.

A color filter 210 may be formed on the second base substrate 200 on which the light blocking pattern BM is disposed. The color filter 210 may overlap the first electrode EL1. The color filter 210 may be formed not to overlap the third electrode EL3.

An over-coating layer 220 may be formed on the color filter 210 and the light blocking pattern BM. The over-coating layer 220 may flatten, protect and insulate the color filter 210. The over-coating layer 220 may include acrylic-epoxy material.

The second electrode EL2 may be formed on the over-coating layer 220. The second electrode EL2 may be formed on the entire second base substrate 200.

Figure 15A:
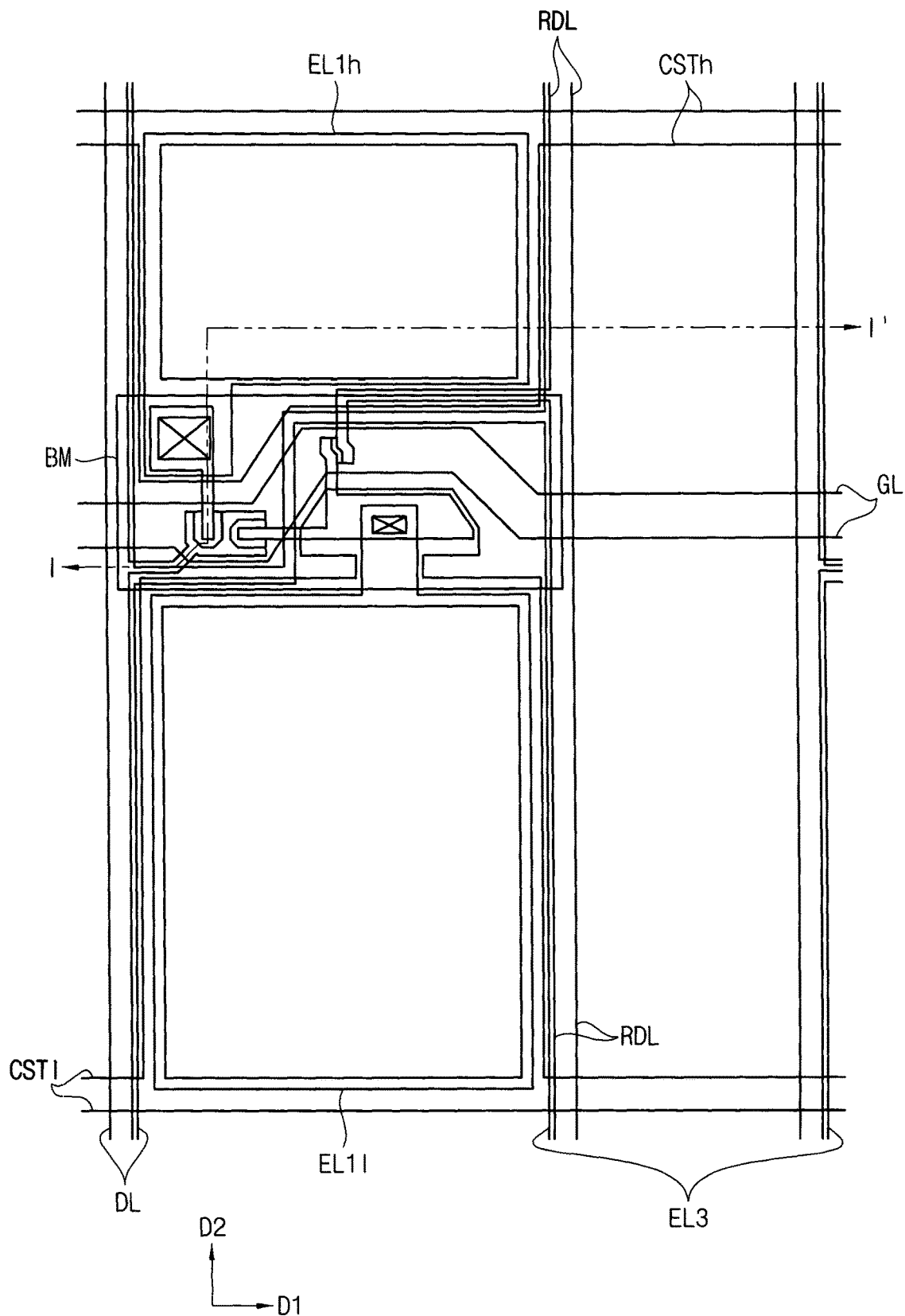
Figure 15B:
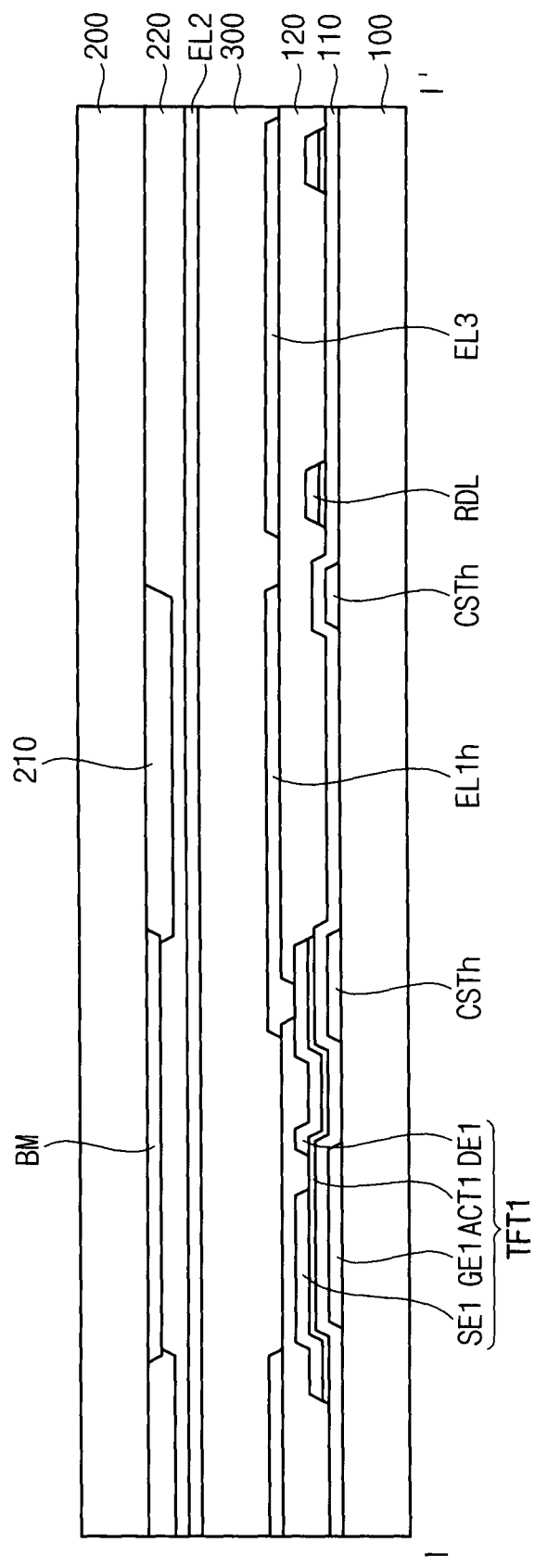

Referring to FIGS. 15A and 15B, a liquid crystal layer 300 may be formed between the first high and first low electrode and the third electrodes EL1$h$, EL1$l$ and EL3 and the second electrode EL2. Accordingly, the display panel may be manufactured.

According to the present inventive concept, a display panel includes a first electrode, a second electrode, a third electrode and a liquid crystal layer to embody a transparent mode and a normal mode. In the transparent mode, an on voltage is applied to the third electrode, and a common voltage is applied to the second electrode. Accordingly, the liquid crystal layer passes light, so that the display panel can work as a transparent display. In the normal mode, an off voltage is applied to the third electrode, and the common voltage is applied to the second electrode. Accordingly, the liquid crystal layer blocks light, so that the display panel can work as a traditional display.

In addition, the display panel may minimize size of a light blocking pattern, and may improve transparency of the display panel by designing a shape of the third electrode. In addition, the transparency may be controlled by adjusting voltage level applied to the third electrode.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and features of the inventive concept. Accordingly, all such modifications are intended to be included within the scope of the inventive concept as defined in the claims. In the claims, any means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A display panel comprising:
    a first base substrate;
    a second base substrate opposing the first base substrate:
    a liquid crystal layer disposed between the first substrate and the second substrate;
    a plurality of gate lines and a plurality of data lines disposed on the first substrate; and
    a plurality of pixels connected to the plurality of gate lines and the plurality of data lines, each of the plurality of pixels including:
    a thin film transistor disposed on first base substrate, and electrically connected to a respective gate line and a respective data line;
    a first electrode disposed on the first base substrate and electrically connected to the thin film transistor;
    a third electrode disposed on the first base substrate and spaced apart from the first electrode in a plan view; and
    a second electrode facing the first electrode and the third electrode, and entirely overlapping the respective data line in a first direction, a common voltage being configured to be applied to the second electrode,
    wherein the third electrode includes a connecting electrode electrically connected to a third electrode of an adjacent pixel.

2. The display panel of claim 1, wherein a difference between off voltage of the third electrode and the common voltage is less than 1.5V (voltage).

3. The display panel of claim 1, wherein a voltage having a value between on voltage and the off voltage is configured to be applied to the third electrode.

4. The display panel of claim 1, wherein a portion of the third electrode overlaps the respective data line.

5. The display panel of claim 1, wherein the third electrode is configured not to be directly connected to the thin film transistor in a pixel.

6. The display panel of claim 1, further comprising a color filter which is disposed to overlap the first electrode, and not to overlap the third electrode.

7. The display panel of claim 1, wherein the first electrode and the third electrode comprise a same material.

8. The display panel of claim 1, wherein the first electrode and the third electrode are disposed in a same plane.

9. The display panel of claim 1, further comprising a light blocking pattern overlapping the thin film transistor.

10. The display panel of claim 9, wherein the light blocking pattern is not connected to and spaced apart from a light blocking pattern of an adjacent pixel.

11. The display panel of claim 1, wherein the first electrode comprises a first high electrode and a first low electrode, and the thin film transistor comprises a first thin film transistor and a second thin film transistor, and
    the first high electrode is electrically connected to the first thin film transistor, and the first low electrode is electrically connected to the second thin film transistor.

12. The display panel of claim 11, further comprises a third thin film transistor and a dividing reference voltage line extending in parallel with the respective data line,
    wherein the third thin film transistor is electrically connected to the dividing reference voltage line and the second thin film transistor, and
    a dividing reference voltage is configured to be applied to the dividing reference voltage line.

13. The display panel of claim 11, wherein the dividing reference voltage line does not overlap the first high electrode and the first low electrode.

14. The display panel of claim 1, wherein the third electrode comprises a first stem extending in a first direction, a second stem extending in a second direction which crosses the first direction, and a plurality of slit portions extending in a direction which is inclined with respect to the first and second directions, the slit portions forming a plurality of slits.

15. The display panel of claim 1, wherein the third electrode overlaps the thin film transistor.

16. The display panel of claim 1, wherein the each of the plurality of pixels further includes a fourth electrode disposed on the first base substrate and spaced apart from the first electrode and the third electrode in a plan view, the fourth electrode being applied with a voltage different from that of the first electrode, and
    wherein the connecting electrode extends along the first direction.

17. The display panel of claim 16, wherein the connecting electrode is disposed between the first electrode and the fourth electrode not to overlap the first electrode and the fourth electrode in a plan view.

18. The display panel of claim 17, wherein the connecting electrode does not overlap the thin film transistor in a plan view.

19. The display panel of claim 17, wherein the connecting electrode completely overlaps the thin film transistor in a plan view.

* * * * *